United States Patent [19]

Takashi et al.

[11] 4,295,722
[45] Oct. 20, 1981

[54] CAMERA FOR DAYLIGHT AND FLASH PHOTOGRAPHY

[75] Inventors: Uchiyama Takashi; Tokuichi Tsunekawa, both of Yokohama; Takehiko Kiyohara, Kanagawa, all of Japan

[73] Assignee: Canon Kabushiki Kaisha, Tokyo, Japan

[21] Appl. No.: 104,691

[22] Filed: Dec. 17, 1979

Related U.S. Application Data

[60] Division of Ser. No. 10,904, Feb. 9, 1979, Pat. No. 4,268,139, which is a continuation of Ser. No. 638,084, Dec. 5, 1975, abandoned.

[30] Foreign Application Priority Data

Dec. 10, 1974 [JP] Japan ................ 49-141740

[51] Int. Cl.³ ............................ B03B 15/03
[52] U.S. Cl. ............................ 354/146; 354/147
[58] Field of Search .......... 354/34, 129, 139, 149, 354/133, 136–138, 146, 147

[56] References Cited

U.S. PATENT DOCUMENTS

| 2,930,298 | 3/1960 | Suzukawa | 354/146 X |
| 3,593,633 | 7/1971 | Shimomura | 354/146 |
| 3,675,561 | 7/1972 | Schwarz | 354/33 X |
| 3,720,144 | 3/1973 | Uchiyama | 354/34 |
| 3,756,132 | 9/1973 | Ogawa | 354/32 |
| 3,757,654 | 9/1973 | Mori | 354/33 |
| 3,833,915 | 9/1974 | Tanaka et al. | 354/246 X |
| 3,964,077 | 6/1976 | Strauss | 354/32 X |
| 3,974,511 | 8/1976 | Matsumoto | 354/147 |
| 3,987,468 | 10/1976 | Matsuzaki et al. | 354/147 X |

OTHER PUBLICATIONS

Mannheim, Photography Theory & Practice, "The Camera", 1970, pp. 255–258.

Primary Examiner—L. T. Hix
Assistant Examiner—William B. Perkey
Attorney, Agent, or Firm—Toren, McGeady and Stanger

[57] ABSTRACT

A flash unit triggering arrangement that cooperates with a shutter control mechanism or circuit of a camera for permitting the firing of a flash lamp of the flash unit in a time period during which the entire area of a film aperture of the camera remains unblocked to thereby avoid flash exposure of only a part of the film.

2 Claims, 12 Drawing Figures

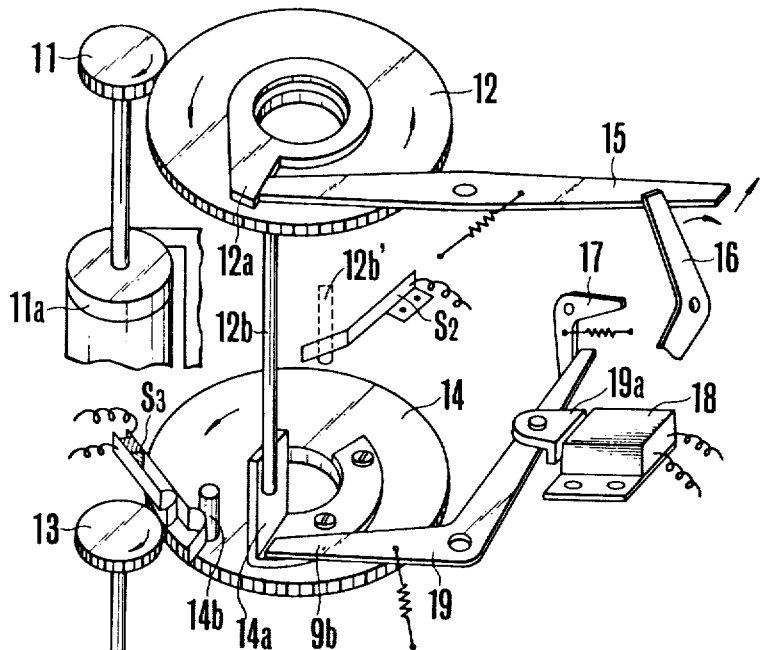
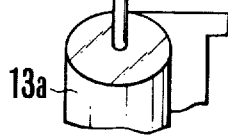
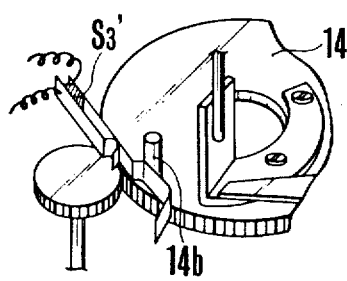
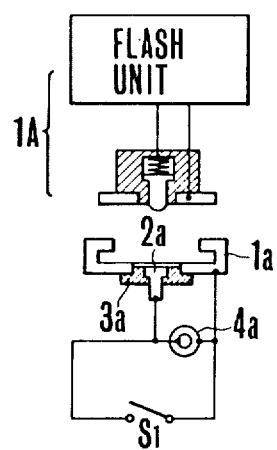

CAMERA FOR DAYLIGHT AND FLASH PHOTOGRAPHY

This is a division of application Ser. No. 010,904, filed Feb. 9, 1979, now U.S. Pat. No. 4,268,139 which is a continuation of Ser. No. 638,084, filed Dec. 5, 1975, now abandoned.

BACKGROUND OF THE INVENTION

1. Field of the Invention

This invention relates to cameras for daylight and flash photography, and more particularly to a triggering arrangement for controlling the operation of a flash unit associated with a camera in conformity with the operation of the camera shutter to establish a uniform flash exposure over the entire area of the film at shutter speeds wherein the running-down movement of the trailing shutter curtain is factored into the flash exposure determination.

2. Description of the Prior Art

The conventional type of trigger devices are so designed that a flash unit associated with a camera operates with only one of the paired shutter blades or curtains of the camera, namely, the leading shutter curtain, in such a manner that the firing of the flash lamp is initiated at a point in time when the leading shutter curtain arrives at the opposite terminal end position as it runs down in front of and across the film aperture. With this trigger device, however, when the shutter control mechanism is set to a fast shutter speed position where the ends of the leading and trailing curtains are spaced from each other by a distance smaller than the longitudinal length of the film aperture, in other words, when the shutter curtains allow only a narrow band of the image-forming light to travel across the film and to exposure the film, the magnitude of the exposure is non-uniform in different regions of the film. For better understanding of this phenomenon, reference may be had to FIGS. 1A and 1B of the attached drawings.

FIG. 1A shows the variation with time of the position of either of the leading and trailing shutter curtains relative to the other as they travel across the focal plane of the camera to make a daylight exposure in connection with the duration of the firing of a flash lamp for which an exposure under combined daylight and flash lighting, or complex lighting conditions, is made. In this figure, the abscissa represents time, and the ordinate represents the longitudinal length of an exposure aperture at the focal plane for curves designated by the characters, a, $b_0$ and $b_1$ through $b_7$, representing various exposure time intervals. The ordinate also represents the magnitude of the flash output energy for a curve A available from an electronic flash unit and for curves B and C from bulb type flash units. When the camera shutter is released to make an exposure, the rear end of the leading shutter curtain traverses the camera focal plane as shown by curve a, that is, the rear end of the leading shutter curtain traverses one end of the effective area of the image at a point in time coincident with the origin of the coordinate axes and reaches the opposite end of the image at a point in time designated by $t_1$. At the end $t_1$, the entire film gate is open and the exposure of the film over the entire effective area of the image or through the film gate is established as the trailing shutter curtain is uniformly retained in the unblocked position.

According to the prior art, therefore, the trigger device is so constructed to initiate the firing of the flash lamp at this time $t_1$. As the electronic type flash lamp unit operates in a time period between times $t_1$ and $t_2$, the front end of the trailing curtain begins blocking the film gate as shown by one of curves $b_1$ through $b_4$ with times $t_2$ through $t_5$, respectively, subsequent to the operation of the flush unit whereby a uniform flash exposure is effected over the entire area of the image. Now assuming that the trailing curtain is caused to block the film gate from the image-forming light in such a manner as shown by curve $b_0$ beginning with time $t_0$, an open slit is formed in the shutter, this shutter slit being moved across the film so that when the flash lamp is triggered at the time $t_1$, the exposure is different in two portions of the image as shown in FIG. 1B, wherein the hatched portion of the image is blocked by the trailing curtain and is therefore taken in the ambient lighting condition alone, while the other portion is taken under the complex lighting condition. In the case of the latter type of flash units, such as those employing M grade or FP grade flash bulbs in which the firing duration is relatively long, as shown by curves B and C of FIG. 1A, the blocking of the film gate must be initiated at a point in time, for example, 30 to 40 milliseconds, after the initiation of establishment of the entire unblocking of the film gate as indicated by curves $b_5$ to $b_7$. If this precaution is not taken, only part of the flash light energy produced by the flash bulb would be used, although the film would be uniformly exposed over the entire area of the image.

With the foregoing in mind, it has been common in the prior art to adjust the shutter speed to a certain value, for example, usually 1/60 second each time an exposure is made in the flash mode. This adjustment is usually carried out by manipulating the shutter dial of the camera, and therefore is liable to be overlooked, particularly when a flash exposure is to be made between daylight exposures. Moreover, there is a possibility of accidentially setting the shutter dial to a shutter faster than 1/60 second at one or more times in the course of a series of flash exposures. Such an accident is undetectable as long as the photographer is forced to be aware of the subject lighting condition derived from the flash unit, because no change occurs in the subject lighting condition by the accident. To ignore such accidental setting of the shutter dial is to limit the percentage of photographs taken by flash illumination which will be found acceptable.

SUMMARY OF THE INVENTION

An object of the present invention is to provide a trigger device which overcomes the foregoing drawbacks and disadvantages of the prior art triggering arrangement.

Another object of the invention is to provide a novel triggering arrangement in which the firing of the flash lamp is prevented from occurring when the ends of the leading and trailing shutter members are spaced apart from each other but separated by a distance shorter than the longitudinal length of the effective area of the image.

Still another object of the invention is to provide a triggering arrangement associated with switching means controlling the period of actuation of the shutter, whereby the uniformity of the flash exposure over the entire area of the image is assured, as the firing of the flash lamp is initiated after the termination of movement of the leading shutter member for unblocking the film gate and before the initiation of movement of the trailing shutter member for blocking the film gate, despite the fact that the shutter dial of the camera is previously set in a position for providing a shutter speed different from or faster than that defined by the successive movements of the two shutter members.

A further object of the invention is to provide a triggering arrangement associated with the shutter control means of the camera for assisting in making a correct exposure either under daylight illumination, or under flash illumination, or under complex illumination, independently of what type of flash unit is used, while making full use of the flash light energy available from the used flash bulb.

A further object of the invention is to provide a trigger device of the type described which is simple in construction and arrangement and is reliable in operation.

Other objects and features of the invention will become apparent from the following detailed description taken in conjunction with the accompanying drawings.

BRIEF DESCRIPTION OF THE DRAWINGS

In the drawings:

FIG. 3 is an exploded perspective view on a greatly enlarged scale of a drive mechanism for a two-curtain type focal plane shutter with the leading and trailing shutter curtain control members being arranged to cooperate respectively with the two switches of FIG. 2;

FIG. 4 is a fragmentally perspective view of the arrangement of FIG. 3 showing a slight modification in the construction of the switch $S_1$ serving as a delay means;

FIG. 5 is a schematic view showing an example of a variation of the trigger device of FIG. 1 according to the present invention;

DESCRIPTION OF THE PREFERRED EMBODIMENTS

Figure 2:
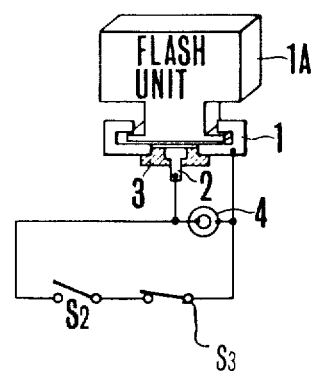
FIG. 2 is a partly perspective and partly schematic view of one embodiment of a trigger device of mechanical type according to the present invention.

Referring to FIGS. 2 and 3, there is shown one embodiment of a mechanical switch type for a trigger device according to the present invention as comprising a pair of switches $S_2$ and $S_3$ connected in series with each other and to a firing circuit for a flash lamp incorporated in a flash unit 1A through interconnection terminals 1 and 2, electrically insulated from each other by an insulating material 3. One of the interconnection terminals is constructed in the form of an accessory shoe 1 provided on the top panel of the camera housing, not shown, and in which the flash unit 1A is mounted on the camera when an exposure is made in the flash mode. In order to use the flash unit 1A as remotely separated from the camera, there is provided a jacket 4 electrically connected to the series circuit of switches $S_2$ and $S_3$ as well as in parallel with the interconnection terminals 1 and 2. The jacket 4 is adapted to receive a plug terminating at the firing circuit of the flash unit. This jacket 4 is usually mounted on the front panel of the camera housing.

As shown in FIG. 3, these two switches $S_2$ and $S_3$ are arranged to cooperate with a drive mechanism for a focal plane shutter having leading and trailing shutter curtains. The drive mechanism is shown in the shutter-cocked position, and essentially comprises a pair of spring powered winding drums 11a and 13a on which the leading and trailing shutter curtains are respectively windable as an exposure is initiated and then terminated, a pair of pinions 11 and 13 mounted on the respective shafts of the winding drums 11a and 13a at ends thereof and meshing with respective drive control gears 12 and 14 which are rotatable about a common axis independently of each other, a first latching lever 15 for maintaining the gear 12 in the shutter-cocked position by engagement at an arm end with a pawl 12a of a pawl disk fixedly mounted on the gear 12 until the shutter is released, and a second latching lever 19 for maintaining the gear 14 in the shutter-cocked position by engagement at its arm end 9b with a projection 14b upwardly perpendicularly extending from the gear 14 until the solenoid of an electromagnet 18 is deenergized, permitting the armature 19a to move away from the electromagnet 18 at a point in time when the duration of the exposure is terminated. The gear 12 carries an elongated pin 12b extending downwardly in parallel with the common rotation axis, and has a size such that it rotates one half revolution as the leading shutter curtain runs down from one terminal position to the opposite terminal position where the film gate is fully open. Therefore, the first switch $S_2$ of the trigger device of the invention which is normally open is positioned in the path of movement of the pin 12b at a location near the terminal end thereof, so that the closure of switch $S_2$ is initiated at a moment at which the rear end of the leading shutter curtain has reached the opposite end of the film gate. The second switch $S_3$ which is normally closed is arranged to cooperate with the gear 14 through intermediary of a pin 14b upwardly extending from the gear 14 in parallel with the common rotation axis in such a manner that the switch $S_3$ is opened when the trailing shutter curtain begins to run down.

The operation of the trigger device of FIGS. 2 and 3 will next be explained in connection with the operation of the shutter. A flash unit 1A, as for example, disclosed in U.S. Pat. No. 3,591,829, is brought into association with the camera either at the accessory shoe 1, or at the jacket 4. Next, when the camera is released, a quck-return reflex mirror, not shown, is moved from its viewing position to its non-viewing position in which the first latching lever 15 is actuated by a lever 16 to turn counter-clockwise against the bias force of a spring, permitting the gear 12 to rotate through a space of one half revolution thereof in the counter-clockwise direction under the action of a spring, not shown, mounted in the winding drum 11a. At the termination of rotation of the gear 12 by an angular distance of about 180°, the elongated pin 12b is brought into contact with the movable contact of the first switch $S_2$.

Assuming now that the exposure time which may be equal to that preselected on the shutter dial or may correspond to the exposure value derived from the computer of the exposure control apparatus is slower than 1/60 second, at the time when the first switch $S_2$ is closed by pin 12b, the trailing shutter curtain control gear 14 is not yet released from the second latching lever 19, as electromagnet 18 remains energized to assure the closing of the second switch $S_3$. Thus, the circuitry of the trigger device of the invention is rendered effective to initiate the firing of the flash lamp in the flash unit 1A. After the duration of 1/60 second from the initiation of running-down movement of the leading shutter curtain, in other words, after the establishment of the full opening of the film gate, the solenoid of electromagnet 18 is deenergized causing the second latching lever 19 to turn counter-clockwise under the action of a spring. Such movement of gear 19 causes disengagement of lever end 19b from projection 14a which in turn causes counter-clockwise movement of gear 14, whereby the trailing shutter curtain runs down to the blocking position to terminate the exposure.

Assuming alternately that the exposure time is faster than 1/60 second, or equal to 1/500 second, for example, the ends of the leading and trailing curtains are spaced apart from each other, but separated by a distance shorter than the longitudinal length of the film gate to form an open slit, so that when electromagnet 18 is deenergized to open the second switch $S_3$, the first switch $S_2$ is not yet closed. Therefore, in this case, the firing circuit for the flash lamp is not brought into operation so that no flash light is produced from the flash unit 1A.

It will be appreciated from the foregoing that the firing circuit for the flash lamp is closed only when the exposure time is slower than a certain level, in this instance, 1/60 second, in other words, only when the fully open state of the film gate is established, and therefore that there is no possibility of effecting variations in the magnitude of an exposure in different portions of the image when the exposure is made under flash illumination or under complex illumination. This provides an additional advantage for the photographer of being made aware that the desired complex exposure has not been effected, that is, that when no flash light is produced from the associated flash unit during an exposure, the photographer is informed either of the fact that the shutter speed preselected on the shutter dial was improper for flash photography, or of the fact that the light level as sensed by the light meter of the automatic exposure control apparatus is so high that there is no need of flash illumination so long as the apparatus is rendered operative in the diaphragm preselection exposure control mode.

Figure 1A:
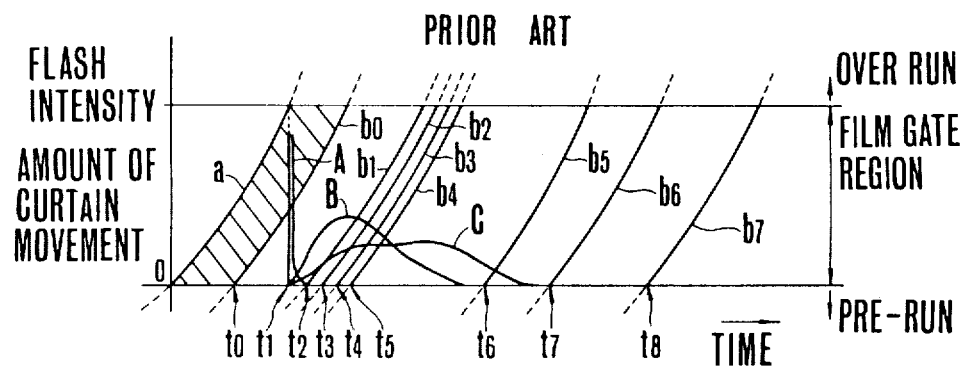
FIG. 1A is a graph showing various timing relationships between the firing time duration of flash units of different types and a number of exposure time intervals defined by movements of the leading and trailing shutter members.

As shown in FIG. 4, the configuration of the movable contact of the second switch $S_3$ may be modified by providing a sliding surface for the pin 14b of a length such that the second switch $S_3'$ remains closed in a time interval between a time at which the trailing shutter curtain begins to run down and a time at which the film gate begins to be blocked by the trailing shutter curtain. This arrangement is particularly effective when the flash unit is of the type having a relatively long firing duration as shown by curve A in FIG. 1A. In this case, it is preferred to adjust this time interval delayed to a time interval between times $t_1$ and $t_2$.

Figure 6:
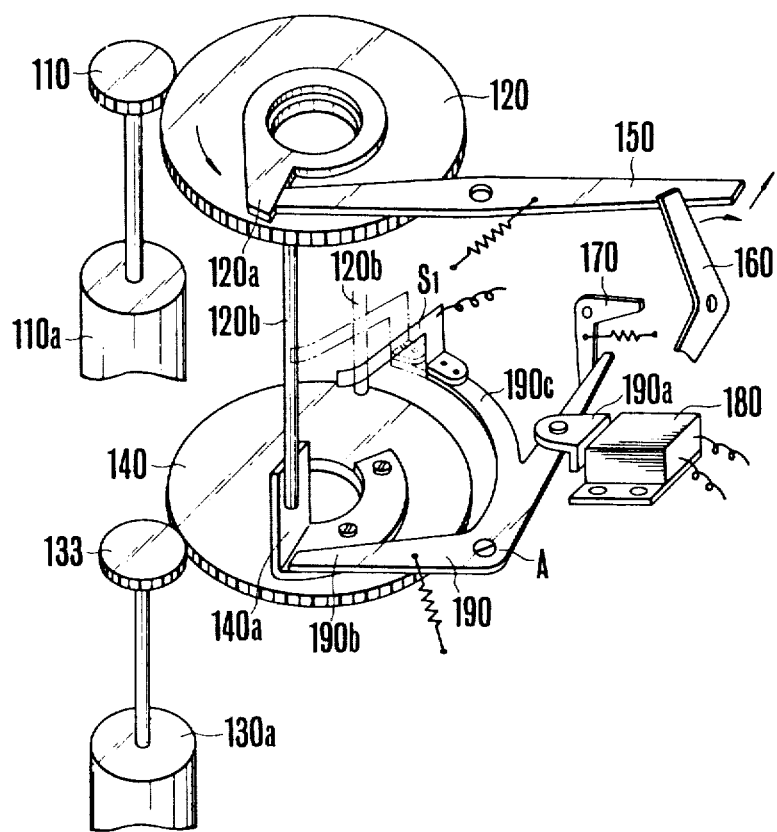
FIG. 6 is an exploded perspective view on a greatly enlarged scale of a shutter drive mechanism similar to that of FIG. 3, with the actuating member for the trailing shutter curtain being shown as associated with the switch $S_1$ of FIG. 5.

FIG. 5 and FIG. 6 show an example of variation of the trigger device of FIG. 3 and FIG. 4, wherein the pair of switches $S_2$ and $S_3$ are replaced by a single switch $S_1$, while nevertheless preserving the principle of the invention. In FIG. 6, the parts corresponding to those of FIG. 3 are denoted by reference numerals equal to 10 times the reference numerals of the corresponding parts of FIG. 3. The second latching lever 190 is pivoted at a pin A fixedly mounted on a stationary frame of the camera, and is provided with an additional arcuate extension or arm 190c which is somewhat concentric to the common rotation axis of the gears 120 and 140 and which is disposed along, but outside of the path of travel of the projection 140a. At the end of the arcuate extension 190c is fixedly carried a synchronous contact of the switch $S_1$, so that when the full opening of the film gate is established, the switch $S_1$ is closed by the elongated pin 120b. With the trigger device of such construction and arrangement, when the exposure time is so fast that an open slit is formed with a transverse length shorter than that of the film gate, and therefore no flash light is produced, the switch $S_1$ is not closed, because the electromagnet 18 is deenergized to release the lever 190 from the latched position, thereby the synchronous contact of the switch $S_1$ is caused to move to a position indicated by broken lines beyond the terminal end position of the elongated pin 120b, before the pin 120 reaches this terminal end position. After the exposure has been completed, the film winding lever, not shown, may be cocked to reset the shutter and the drive mechanism therefor to the initial positions. In the course of this shutter cocking operation, the elongated pin 12b or 120b serves as a motion transmitting member from the gear 12 or 120 to the gear 14 or 140. It is to be understood that the trigger device of the present invention is very simple in construction and arrangement, but is reliable in controlling the firing of the flash lamp in conformity with the amount of the exposure duration.

Figure 1B:
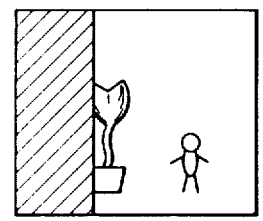
FIG. 1B is a pictorial representation showing an example of variations in the magnitude of an exposure under complex illumination which is effected in two different regions of an image according to the prior art.
Figure 7:
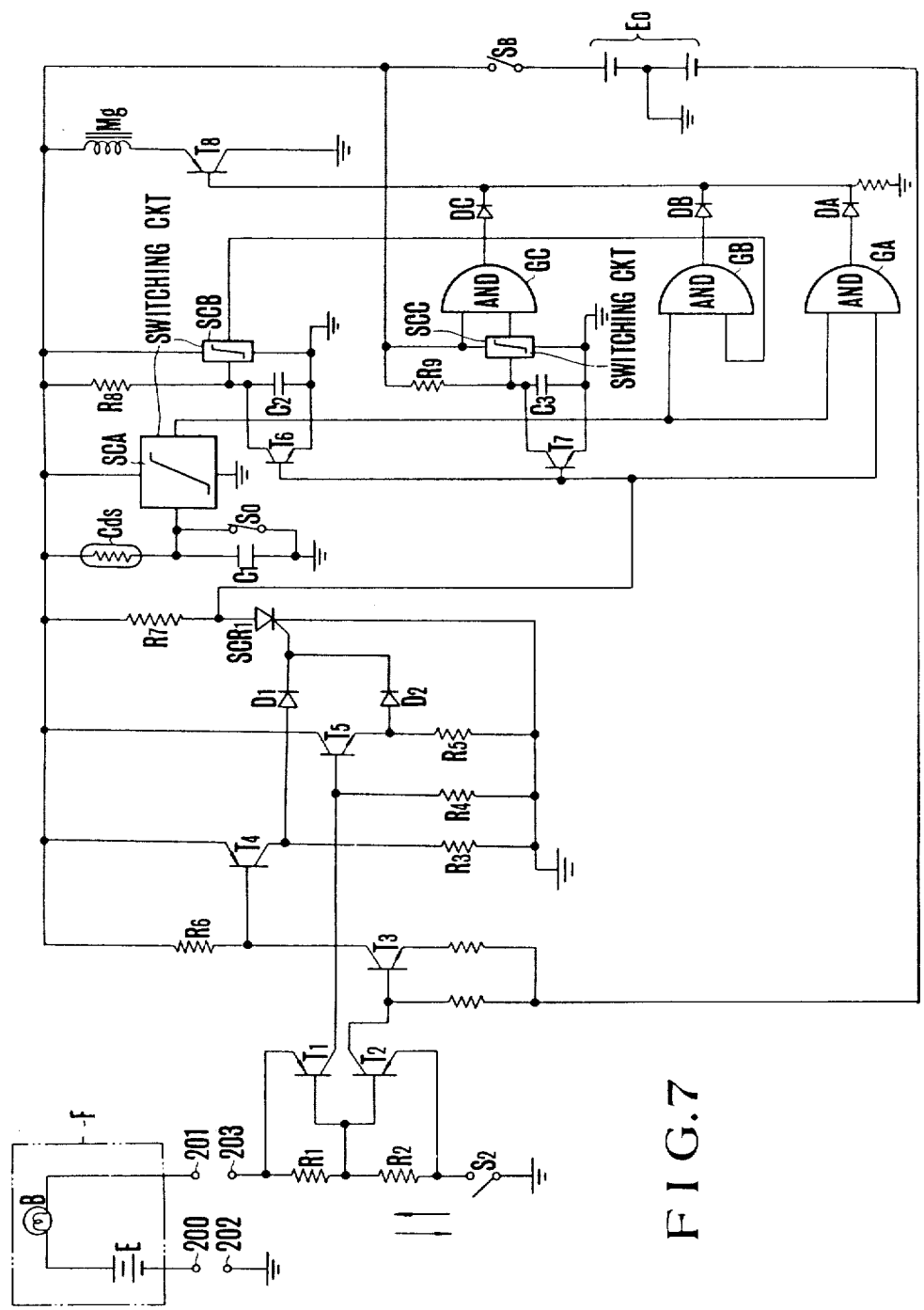
FIG. 7 is a schematic circuit diagram, partly in block form, of another embodiment of a trigger device of electronic type according to the present invention adapted for use with a bulb type flash unit and cooperating with the switching means of an automatic exposure control circuit for controlling the period of actuation of the trailing shutter curtain.

Referring now to FIG. 7, there is shown another embodiment of a trigger device according to the present invention adapted for use with the bulb type flash unit. Although not shown in FIG. 7, for the purpose of clarity, the trigger device includes a mechanical trigger control switch corresponding to the second switch $S_3$ of FIGS. 2 and 3 in addition to a mechanical trigger control switch corresponding to the first switch $S_2$ of FIGS. 2 and 3 and which is shown at $S_2$ in FIG. 7, the first and second mechanical trigger control switches of FIG. 7 being identical in construction and arrangement to those of FIGS. 2 and 3. In order to make use of all the amount of flash light energy available from a flash bulb for the exposure of photographic film, this embodiment of the invention contemplates the use of an electronic additional or third trigger control switch in combination with a timing circuit having a time constant of 30 to 40 milliseconds determined by taking into account the amount of firing duration of the flash bulb indicated by curves B and C in FIG. 1 and a switching circuit responsive to the output of the timing circuit for energizing and deenergizing a common solenoid of electromagnet Mg constituting part of an automatic daylight exposure control circuit.

The electronic trigger control switch comprises a pair of interconnection terminals 202 and 203 adapted for coupling with respective interconnection terminals 200 and 201 provided on a flash unit F housing having incorporated therein a trigger power source or battery E and a flash bulb B. Terminal 202 is grounded and terminal 203 is connected to ground through a pair of series-connected resistors $R_1$ and $R_2$ and through the first and second trigger control switches $S_2$ and $S_3$, although the switch $S_3$ is not shown. The electronic trigger control switch further includes first and second pnp transistors $T_1$ and $T_2$ with their emitter and base electrodes connected across resistors $R_1$ and $R_2$ so that transistors $T_1$ and $T_2$ are rendered conducting and non-conducting when a current flows downward or upward as viewed in FIG. 7, and a thyrister $SCR_1$ having an anode connected to through a resistor $R_7$ to the positive bus, having a cathode grounded and having a gate electrode connected to both of the first and second collector transistor circuits of the first and second transistors $T_1$ and $T_2$ through diode $D_2$ and $D_1$, respectively. The first collector transistor circuit comprises a npn transistor $T_5$ having a base electrode connected to the collector electrode of transistor $T_1$, having a collector electrode connected to the positive bus, and having an emitter electrode both through a resistor $R_5$ to ground and through the diode $D_2$ to the gate electrode of thyristor $SCR_1$. The second collector transistor circuit comprises a npn transistor $T_3$ having a base electrode connected both to the collector electrode of transistor $T_2$ and to the negative bus through a resistor, having an emitter electrode connected through a resistor to the negative bus, and having a collector electrode connected through a resistor $R_6$ to the positive bus, and another pnp transistor $T_4$ having a base electrode connected to the collector electrode of transistor $T_3$, having an emitter electrode connected to the positive bus and having a collector electrode connected both through a resistor $R_3$ to ground and through the diode $D_1$ to the gate electrode of thyristor $SCR_1$.

The automatic daylight exposure control circuit comprises a photoelectric element such as a cadmium sulfide CdS and silicon photo cell, a capacitor $C_1$ constituting a timing circuit together with the element CdS, and a switching circuit SCA responsive to the output of the timing circuit for energizing and deenergizing the common solenoid of an electromagnet Mg through an intermediary to be described later. Connected across the timing capacitor $C_1$ is a count start switch $S_O$ which is opened when the leading shutter curtain begins to run down to the open position. The switching circuit SCA may be constructed from a Schmitt trigger circuit.

The timing circuit having a time constant of 30 to 40 milliseconds comprises a resistor $R_8$ and a capacitor $C_2$ connected in series with each other and is connected between the positive bus and ground. The output of the timing circuit is connected to a Schmitt trigger or switching circuit SCB for energizing and deenergizing the common solenoid Mg.

The circuit of FIG. 7 further includes a timing circuit having a time constant of ⅛ second and comprising a resistor $R_9$ and a capacitor $C_3$, and a Schmitt trigger or switching circuit SCC responsive to the output of the timing circuit for energizing and deenergizing the common solenoid Mg.

For selecting one of three Schmitt trigger circuits SCA, SCB and SCC for cooperation with the common electromagnet Mg through a switching transistor $T_8$ therefor in automatic response to the detection of the object brightness level, there is provided a pair of short-circuiting npn transistors $T_6$ and $T_7$ for capacitors $C_2$ and $C_3$, respectively, and three AND gates GA, GB and GC. The first AND gate GA has a signal input terminal connected to the output terminal of the first Schmitt trigger circuit SCA, and has a gating control input terminal connected to the anode of the thyristor $SCR_1$, so that when the thyristor $SCR_1$ is in the non-conducting state, a voltage of binary coded "1" level is applied to the gating control input terminal from the positive terminal of a power supply source or battery Eo through a closed power switch SB, whereby the first Schmitt trigger circuit SCA is rendered responsive to the switching transistor $T_8$ for electromagnet Mg, as the output of trigger circuit SCA is applied through the gated-on AND gate GA and a diode DA to the base electrode of transistor $T_8$. This response will occur either when the preselected or computed exposure time is faster than 1/60 second, for example, or when the flash unit F is not associated with the camera.

The operation of the circuit of FIG. 7 for flash photography is as follows. After the flash unit F is associated with the camera at interconnection terminals 200 through 203, the shutter release button is depressed to initiate an exposure. At this time, the count start switch $S_0$ is opened. Assuming now that the light level as sensed by the photo-electric element CdS is so low that the fully open state of the film gate is established to assure the simultaneous closing of both first and second switches $S_2$ and $S_3$ of FIG. 2 or FIG. 3, a trigger current flows from the positive terminal of battery E through a filament of the bulb B, resistors $R_1$ and $R_2$ and closed switches $S_2$ and $S_3$ to ground, causing transistors $T_1$ and $T_2$ to be rendered conducting and non-conducting, respectively. Such conduction of transistor $T_1$ causes conduction of transistor $T_5$ which in turn causes conduction of thyristor $SCR_1$, whereby the first AND gate is opened, while short-circuiting transistors $T_6$ and $T_7$ are turned off. Assuming again that the preselected or computed exposure time is longer than 1/60 second but shorter than 30 to 40 milliseconds, the first trigger circuit SCA produces an output with a binary coded "1" level which is applied to a gating control input terminal of a second AND gate GB. After a time interval of 30 to 40 milliseconds from the initiation of the exposure, the second trigger SCB produces an output which is applied through the gated-on second AND gate GB and a diode DB to the base electrode of the switching transistor $T_8$, whereby the exposure is terminated. It is to be noted that the trailing shutter curtain begins to run down after the firing duration of the flash lamp has been terminated. Assuming alternately that the preselected or computed exposure time is longer than ½ second, the second Schmitt trigger circuit SCB is cut off from transistor $T_8$ at the second AND gate GB, and instead the third Schmitt trigger circuit SCC is brought into cooperation with transistor $T_8$, so that the trailing shutter curtain begins to run down at the termination of duration of a time interval of ½ second as the output of the third trigger circuit SCC is applied through a third AND gate GC and a diode DC to the base electrode of transistor $T_8$.

It will be appreciated from the description of the second embodiment of the invention that when the bulb type flash unit is operated with the trigger device of the invention, there is not only no possibility of taking photographs which will be found unacceptable due to the occurrence of a complex exposure in different portions of an image, in other words, a daylight exposure alone in a portion or portions of an image and a daylight and flash exposure in the other portion of the same image, but also it is made possible to increase the percentage of photographs taken under flash illumination which will be found acceptable by full use of the flash light energy available from the flash bulb, which assures the derivation of a correct flash exposure.

Figure 8:
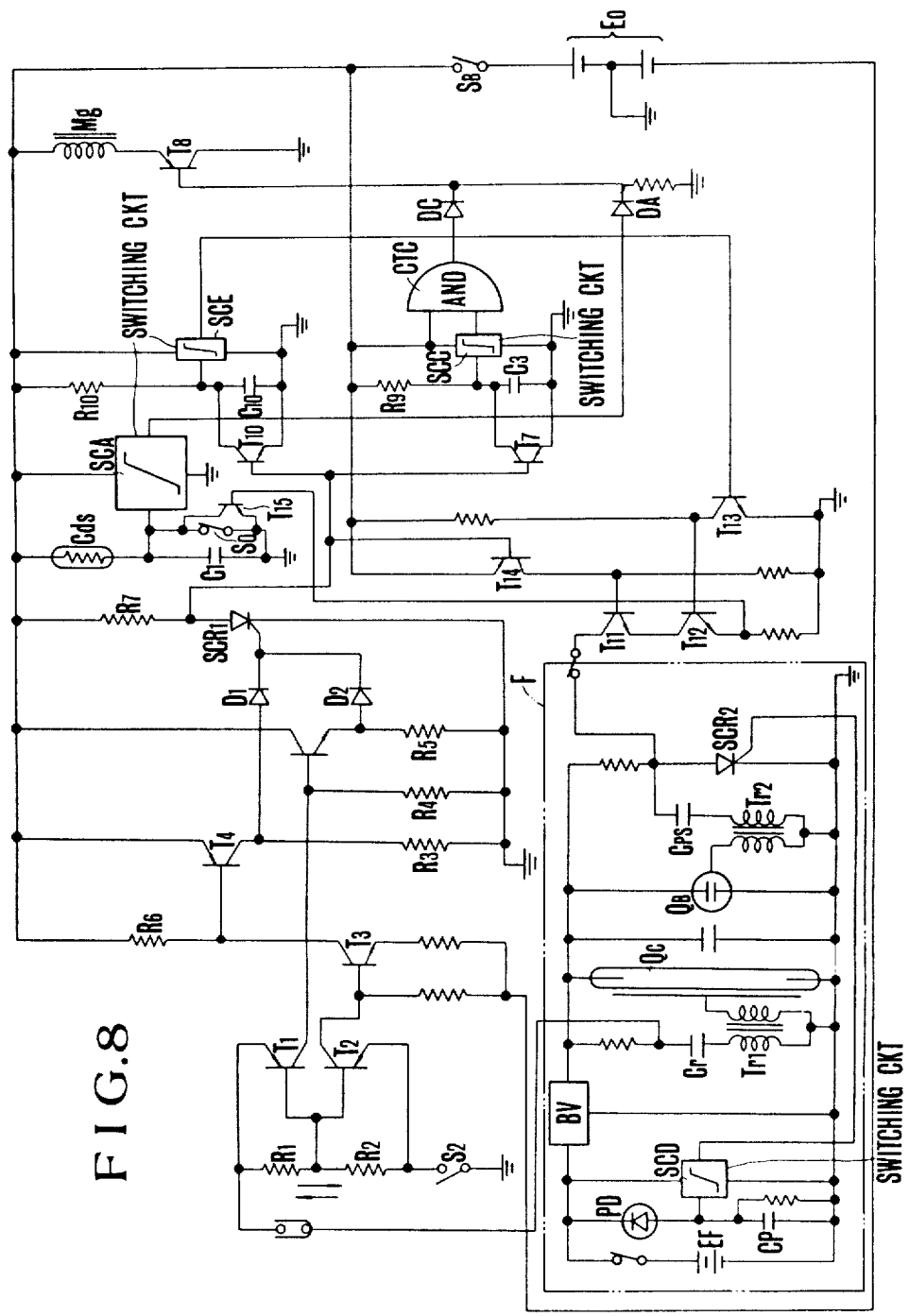
FIG. 8 is a similar diagram showing an example of modification of the trigger device of FIG. 7 as adapted for use with an electronic type flash unit.

FIG. 8 shows an example of modification of the trigger device of FIG. 7 as adapted for use with an electronic type flash unit, wherein the same reference characters have been employed to denote the similar parts to those of FIG. 7. The second timing circuit containing resistor $R_8$ and capacitor $C_2$ of FIG. 7 is replaced by a timing circuit comprising a resistor $R_{10}$ and a capacitor $C_{10}$ and having a time constant of about 1 millisecond determined as suitable for assuring the optimum duration of firing of a discharge tube of the flash unit operated only once per exposure. The output of the first Schmitt trigger circuit is connected through the diode DA to the base electrode of transistor $T_8$ without passing any AND gate, so that when the light level as sensed by the photo-electric element CdS is higher than that for which the ends of the leading and trailing shutter curtains are spaced from each other by a transverse length equal to that of the film gate, the exposure time is controlled in accordance with the object brightness level to make a daylight exposure.

When the full opening of the film gate is established to assure the simultaneous closing of the first and second trigger control switches $S_2$ and $S_3$, a capacitor Cr in a striking circuit for a Xenon discharge tube Qc is discharged through the primary coil of a transformer $Tr_1$ and at the same time a current flows through resistors $R_1$ and $R_2$ constituting part of the trigger device of the invention, whereby the thyristor $SCR_1$ is rendered conducting. Such conduction of thyristor $SCR_1$ results in non-conduction of short-circuiting npn transistors $T_{10}$ and $T_7$ for second and third timing capacitors $C_{10}$ and $C_3$, respectively, and further in conduction of a pnp transistor $T_{14}$ and npn transistor $T_{11}$ in sequence. Because of the normal conduction of a npn transistor $T_{12}$, a npn transistor $T_{15}$ connected across the timing capacitor $C_1$ is rendered conducting by the conduction of transistors $T_{11}$ and $T_{12}$ to discharge capacitor $C_1$, which has so far been charged from the time at which the leading shutter curtain begins to run down to the open position, or at which the count start switch $S_0$ is opened. Assuming now that the output voltage of a flash light value sensor of the flash unit F, which comprises a photo-diode PD at a capacitor $C_p$ connected in series with each other, reaches a critical level for a switching circuit SCD in a time interval shorter than 1 millisecond, when a thyristor $SCR_2$ of the flash unit F is rendered conducting by the output of switching circuit SCD, a quench $Q_B$ is turned on to terminate the duration of firing of the Xenon discharge tube Qc and at the same time, transistors $T_{11}$ $T_{12}$ and $T_{15}$ are turned off to initiate the charging of the timing capacitor $C_1$. When the time variable voltage of the capacitor $C_1$ reaches the critical level for the switching circuit SCA during a time interval dependent upon the object brightness level under daylight illumination, the switching circuit SCA produces an output which is then applied to the transistor $T_8$ through diode DA, whereby the exposure is terminated. Assuming alternately that the Xenon discharge tube Qc continues to be fired for a time interval longer than 1 millisecond, in other words, the time variable output voltage of the timing circuit PD, Cp does not reach the critical level for the switching circuit SCD in a time interval of 1 millisecond, when the second switching circuit SCE produces an output in the time interval of 1 millisecond after the initiation of the firing of Xenon discharge tube Qc, transistors $T_{13}$, $T_{12}$ and $T_{15}$ are successively turned off to initiate the charging of capacitor $C_1$ for daylight exposure control. When the time variable voltage of the capacitor $C_1$ reaches the critical level for the switching circuit SCA during a time interval dependent upon the object brightness level under daylight illumination, the switching circuit SCA produces an output which is then applied to transistor $T_8$ through diode DA, whereby the exposure is terminated. Assuming further that the switching circuit SCA does not produce an output in a time interval of ½ second after the initiation of the firing of the Xenon tube Qc, the operation of transistor $T_8$ is controlled by the output of the third switching circuit SCC through the AND gate CTC and a diode DC in a manner similar to that described in connection with FIG. 7.

Figure 9:
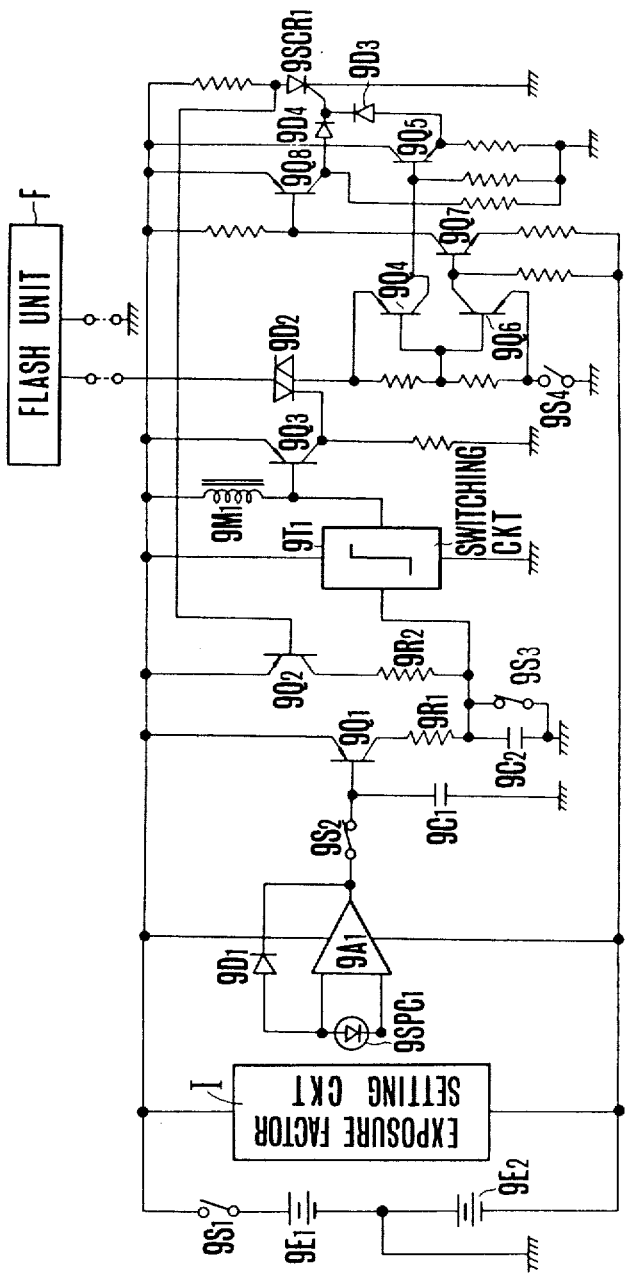
FIG. 9 is a schematic circuit diagram, partly in block form, of still another embodiment of an electronic type of trigger device according to the present invention as associated with a camera of the type having a diaphragm preselection automatic exposure control range.
Figure 10:
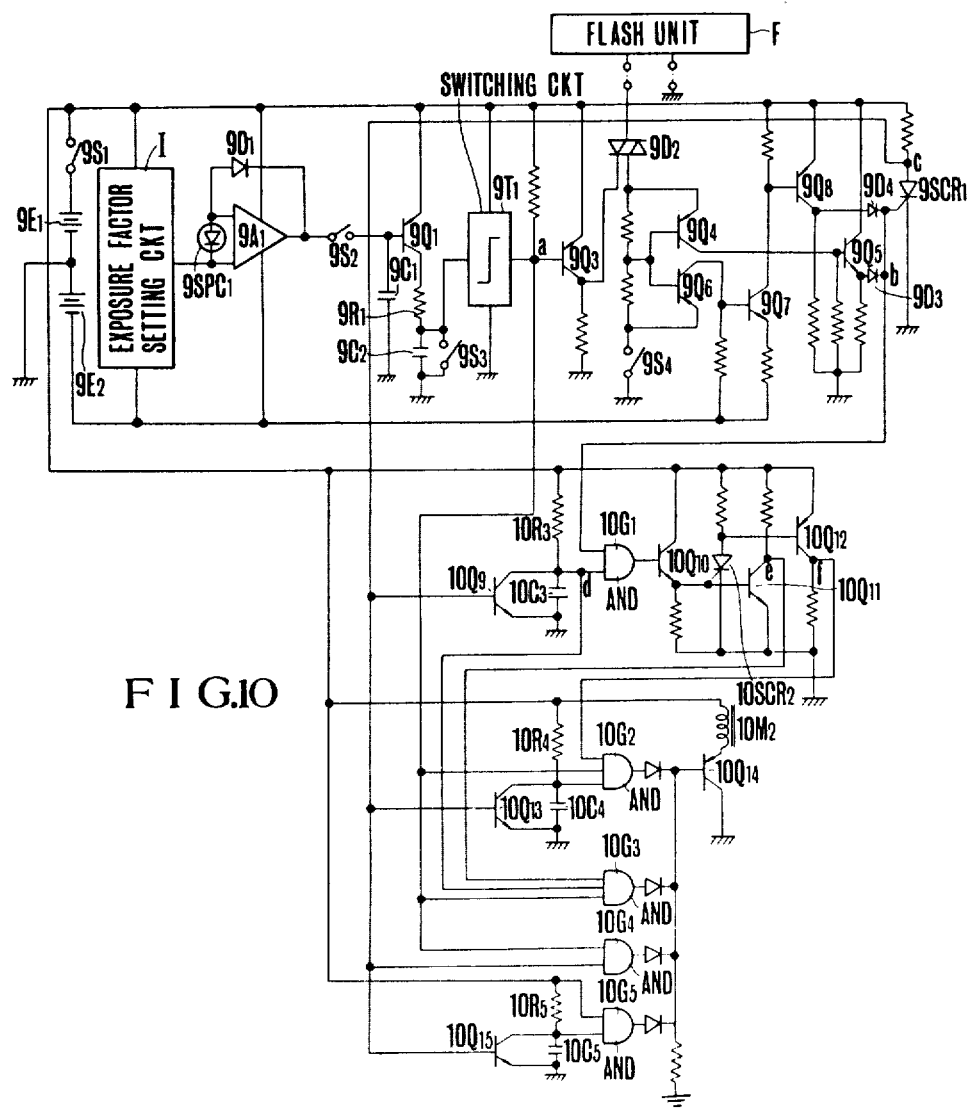
FIG. 10 is a schematic circuit diagram showing one example of a variation of the circuit of FIG. 9 as adjusting the effective exposure time to a value depending upon what type of flash unit is used with the camera.
Figure 11:
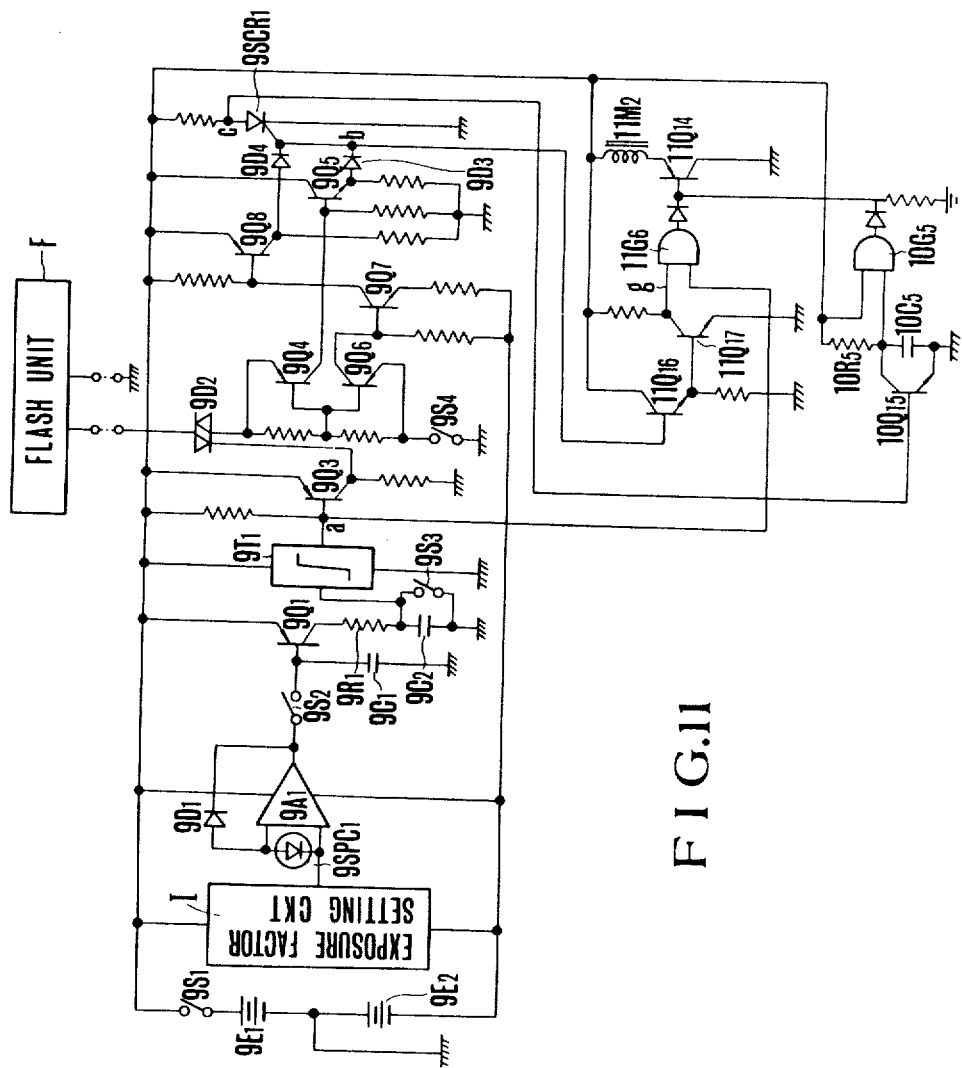
FIG. 11 is a similar diagram showing another example of variation of the circuit of FIG. 9.

Referring to FIGS. 9, 10 and 11, there are shown three examples of still another embodiment of the trigger device according to the present invention as applied to a camera of the type having an electronically timed shutter arranged to be operated in the diaphragm preselection-and-computed result memory exposure control mode. In this third embodiment of the invention, a first mechanical trigger control switch which is generally indicated at $9S_4$ and a third electronic trigger control switch remain substantially unchanged from those of the second embodiment of the invention shown in FIGS. 7 and 8, while a second mechanical trigger control switch is constructed in the form of a transistor circuit and is arranged to cooperate with an electronic switch for the shutter.

The control circuit for controlling the period of actuation of the shutter in accordance with the preselected diaphragm value and the level of brightness of an object being photographed under daylight illumination comprises an exposure control factor setting circuit I for setting the preselected diaphragm value and the sensitivity of the film used, a photosensitive element $9SPC_1$ such as a silicon photo diode having excellent light response characteristics, an operational amplifier $9A_1$ with a feedback diode $9D_1$ responsive to the outputs of the circuit I and element $9SPC_1$ for producing an output representative of an exposure value or effective exposure time, a memory capacitor $9C_1$ connected to the output of amplifier $9A_1$ through a switch $9S_2$ which is opened when the reflex mirror is pivoted upward, a timing circuit containing a transistor $9Q_1$, a resistor $R_1$ and capacitor $9C_2$, and a trigger circuit $9T_1$ responsive to a critical voltage attained by the time variable output voltage of the timing circuit for deenergizing the solenoid $9M_1$ of an electromagnet, whereby the trailing shutter curtain is caused to run down. Connected across the timing capacitor $9C_2$ is a start switch $9S_3$ which is opened when the leading shutter curtain begins to run down.

The second switch of the trigger device of the invention comprises a pnp transistor $9Q_3$ having a base electrode connected to the output of the trigger circuit $9T_1$, having an emitter electrode connected to the positive bus and having a collector electrode grounded through a resistor, and a triac $9D_2$ having bidirectional switching function. The triac $9D_2$ is connected between the first trigger control switch $9S_4$ and one interconnection terminal of the flash unit F, and has a gating control input connected to the collector electrode of transistor $9Q_3$, so that the triac $9D_2$ remains in the conductive state until the solenoid $9M_1$ is energized to retain the trailing shutter curtain in the shutter cocked position.

In the first example shown in FIG. 9, the control circuit for the shutter is further provided with a timing circuit having a time constant of about $\frac{1}{2}$ second and constructed from a transistor $9Q_2$, a resistor $9R_2$ and the common timing capacitor $9C_2$ of the first timing circuit. For flash photography with daylight ambient illumination, a flash unit F which is preferably of the electronic type as shown in FIG. 8 is brought into association with a camera of the type having the control circuit of FIG. 9. It is preferred that the light metering aspect of the camera operates in an overall field of view light metering mode by taking into account the fact that a large proportion of flash photographic situations which may be usually encountered involve a subject of principal interest that is darker than the environment surrounding the subject. The light receiving arrangement of the photosensitive element $9SPC_1$ may be either of through-the-lens (TTL) type or outside-the-lens (OTL) type. The values of given exposure control factors including the film speed and diaphragm aperture are set into the circuit I. Responsive to the output signals from the circuit I and element $9SPC_1$, the computer with the operational amplifier $9A_1$ and with a log-diode $9D_1$ produces an output signal with a magnitude proportional to the logarithm of an exposure value as a result of Apex computation of the given photographic information. The output signal of the computer is tranmitted through the switch $9S_2$ to the storage capacitor $9C_1$ and then stored thereon. After that, the shutter release button, not shown, may be depressed causing switches $9S_2$ and $9S_3$ to be opened. At this time, the charging of the timing capacitor $9C_2$ is initiated, and the solenoid $9M_1$ is energized to retain the trailing shutter curtain in the shutter-cocked position, wherein the transistor $9Q_3$ is in the conductive state. Assuming now that the exposure time as the computed result is sufficiently long to establish the fully open condition of the film gate, when the leading shutter curtain has reached the fully open position, transistor $9Q_3$ remains in the conductive state, so that the triac $9D_2$ is rendered conductive to actuate the firing circuit of the flash unit F. As the flash tube is fired, a current flows through parts, namely, resistors $R_1$ and $R_2$ of the third trigger control circuit containing transistors $9Q_4$ through $9Q_8$ and a thyristor $9SCR_1$, whereby the thyristor $9SCR_1$ is rendered conductive. Such conduction of thyristor $9SCR_1$ causes conduction of transistor $9Q_2$ of the second timing circuit, so that when the exposure time as determined by the output of the computer is longer than $\frac{1}{2}$ second, the resultant exposure time is adjusted to $\frac{1}{2}$ second to avoid introduction of a jiggle or oscillation to the image at the focal plane. It is to be noted that although the subject flash lighting is received by the photosensitive element $9SPR_1$, the computed result is not affected thereby, because the switch $9S_2$ is opened before the initiation of the firing.

In the second example of FIG. 10, there is provided an additional two timing circuits which are selectively operative with the electronic switch of the daylight exposure control circuit, depending upon which of the types of flash units is used, whether the bulb type, or the electronic type. The first additional timing circuit for the electronic type flash unit has a time constant of a few milliseconds and contains a resistor $10R_3$ and a capacitor $10C_3$ connected in series with each other. The second additional timing circuit for the bulb type flash unit has a time constant of 30 to 40 milliseconds and contains a resistor $10R_4$ and a capacitor $10C_4$ connected in series with each other.

In order to select one of these two timing circuits for cooperation with a separate solenoid $10M_2$ that automatically responds to detection of the magnitude of firing duration of the associated flash unit, there is provided a discriminating circuit which contains three transistors $10Q_{10}$, $10Q_{11}$ and $10Q_{12}$ and a thyristor $10SCR_2$. Assuming now that the computed exposure time is sufficiently long to establish the fully open condition of the film gate, when the leading shutter curtain has reached the fully open position, the firing circuit of the flash unit F is actuated and simultaneously the first thyristor $9SCR_1$ is rendered conductive. As a voltage of binary coded "0" level appears at the anode C of first thyristor $9SCR_1$, three short-circuiting transistors $10Q_9$, $10Q_{13}$ and $10Q_{15}$ connected across respective timing capacitors $10C_3$, $10C_4$ and $10C_5$ are turned off. Assuming further that the flash unit F is of the bulb type, when the flash bulb is fired, an output voltage of binary coded "1" level appears at the gating control input terminal (b point) of thyristor $9SCR_1$, and is applied to the gating control input terminal of an AND gate $10G_1$. As the AND gate $10G_1$ is gated on for a time interval longer than a few milliseconds, the time variable voltage of the additional first timing circuit which reaches a binary coded "1" level in time interval of a few milliseconds is applied through the gated-on AND gate $10G_1$ to the base electrode of transistor $10Q_{10}$, whereby the second thyristor $10SCR_2$ and transistor $10Q_{11}$ are rendered conductive, and then transistor $10Q_{12}$ is turned on, causing an output voltage of binary coded "1" level to appear at a point f, or the collector electrode of transistor $10Q_{12}$, and also causing a voltage of binary coded "0" level to appear at a point e, or the collector electrode of transistor $10Q_{11}$. The output voltage from point e is applied to an AND gate $10G_3$, whereby the first timing circuit is cut off from transistor $10Q_{14}$ controlling the solenoid $10M_2$. On the other hand, the output voltage from point f is applied to an AND gate $10G_2$. Also applied to this AND gate $10G_2$ are output voltages from the switching circuit $9T_1$ and the additional second timing circuit, so that when both of these two output voltages reach "1" levels, the second AND gate $10G_2$ produces an outut voltage of "1" level which is applied to the base electrode of transistor $10Q_{14}$. The solenoid $10M_2$ is thereby deenergized, causing the trailing shutter curtain to run down. It is to be noted that the AND gate $10G_2$ is gated on only when all of the three output voltages from the discriminating circuit, the timing circuit having 30 to 40 millisecond time constant and the daylight exposure control switch reach respective "1" levels. Therefore, the bulb type flash unit can be used with a camera having a synchronous contact through which the operation of the flash unit may be controlled when making a flash exposure.

Assuming next that the used flash unit F is of the electronic type, the first AND gate $10G_1$ does not conduct because the firing period is shorter than a few milliseconds. Therefore, the voltage levels at points e and f are "1" and "0", respectively, and further the voltage level at point a remains "0" when the voltage level at point d is turned to "1". As a result, the AND gate $10G_3$ is gated on after a time interval of a few milliseconds from the initiation of the firing, but when the output voltage of the daylight exposure control switch $9T_1$ is turned from "0" to "1". With this arrangement, it is made possible to derive a correct exposure for a brighter environment using the daylight exposure control circuit and for the darker subject of principal interest using the flash energy control circuit incorporated in the flash unit of the electronic type.

A fourth AND gate $10G_4$ is provided for assuring the daylight exposure control even when the flash bulb or tube is not fired, or when no flash unit is associated with the camera. If the voltage level at point c remains "1", when the voltage level at point a is turned to "1", in other words, when the output voltage of the switching circuit $9T_1$ is reversed in binary code, the fourth AND gate $10G_4$ produces an output voltage of "1" level causing the closure of the shutter. The timing circuit containing a resistor $10R_5$ and a capacitor $10C_5$ has a time constant of about ½ second and will be rendered operative when the light level as sensed by the element $9SPC_1$ is very low.

In the third example of FIG. 11, a circuit is provided for retaining the trailing shutter curtain in the open position until the firing of the flash lamp is terminated. When the shutter release button is depressed to actuate the firing circuit of the flash unit F, the voltage level at point b is turned to "1", whereby transistors $11Q_{16}$ and $11Q_{17}$ are turned on to apply a voltage of "0" level to the gating control input terminal of an AND gate $11G_6$ or a point g. Assuming now that the firing of the flash lamp is not yet terminated at a point in time when the output of switching circuit $9T_1$ is reversed in binary code, the AND gate $11G_6$ is not gated on. After that, the firing of the flash lamp is terminated, the voltage level at point b becomes "0", whereby transistors $11Q_{16}$ and $11Q_{17}$ are turned off to apply a voltage of "1" level to the AND gate $11G_6$. As the AND gate $11G_6$ is gated on, a transistor $11Q_{14}$ controlling a solenoid $11M_2$ is turned off to release the trailing shutter curtain from the latched position. A circuit comprised of parts $10G_{15}$, $10R_5$, $10C_5$ and $10G_5$ serves as an exposure time limiting circuit corresponding to that of FIG. 10.

As noted above, the operation of the firing circuit of the associated flash unit is controlled by means of a bidirectional conducting element connected in series with a synchronous contact for the trigger control of the flash unit. Therefore, it is to be understood that the trigger device constructed in accordance with the third embodiment of the invention as well as the first and second embodiments thereof serves as a safety mechanism working in such a manner that even when the synchronous contact is actuated in synchronism with the termination of running down movement of the leading shutter curtain, the firing circuit of the flash unit is not caused to be brought into actuation since the leading shutter curtain has run down.

It will be seen from the foregoing description that these embodiments of the invention accomplish the above-mentioned objects of the invention which may be summarized again as follows:

(1) The film at the focal plane is not exposed in the slit form regardless of how much the preselected or computed exposure time is.

(2) Because the flash unit fails to fire in the case of faster shutter speeds, the photographer is informed immediately after the shutter release that the setting of the camera is not proper for flash photography. Therefore, there is no possibility of making a series of flash exposures which would otherwise result in a change of the magnitude of exposure in the form of a slit at different regions of the image.

(3) The flash unit, although associated with the camera, is not caused to be brought into accidental firing actuation when the shutter is cocked.

These features and advantages of the invention become very prominent particularly when applied to a camera of the type having a shutter preselection automatic exposure control range, in other words, of the type in which a desired diaphragm value is preselected and then combined with the object brightness level to determine an effective exposure time. For example, when the object brightness level is very low, necessitating a relatively long exposure time, the resultant exposure time is readjusted in conformity with the firing duration of the flash unit to make a correct flash exposure. Conversely, when the object brightness is very high, the resultant exposure is made under daylight ambient illumination alone, as the flash unit is not operated. In this case, the trigger device of the invention serves as a mode selector for daylight and flash photography.

We claim:

1. In a camera comprising a film gate, a focal plane shutter having leading and trailing shutter curtains and a control means for triggering movement of the trailing shutter curtain, a flash synchronizing device for enabling the flash illumination of a flash unit, comprising:
   (a) motion transmitting means to be driven in association with the movement of the leading shutter curtain, said motion transmitting means being located at a first position when the film gate is covered by the leading shutter curtain, and being located at a second position when the film gate is fully opened by the running of the leading shutter curtain; and
   (b) a single synchronous contact switch for enabling the flash illumination of the flash unit when the single synchronous switch is set to an operative state, said single synchronous switch being located at a position where it is driven to an operative state in response to arrival at the second position of the motion transmitting means before the control means triggers the movement of the trailing shutter curtain, and being fixedly mounted on a part of the control means in such a positional relation that it is located at a position beyond the second position of the motion transmitting means after the control means has triggered the movement of the trailing shutter curtain.

2. A flash synchronizing device according to claim 1, wherein said motion transmitting means includes an elongated pin associated with the leading shutter curtain.

* * * * *